United States Patent [19]

Pape

[11] Patent Number: 5,796,247
[45] Date of Patent: Aug. 18, 1998

[54] PROCESS AND DEVICE FOR DETERMINING THE ANGULAR POSITION OF A ROTATING SHAFT USING A PULSE WHEEL AND A HALL SENSOR

[75] Inventor: Peter Pape, Bergkamen, Germany

[73] Assignee: AB Elektronik GmbH, Werne, Germany

[21] Appl. No.: 696,862

[22] PCT Filed: Dec. 19, 1995

[86] PCT No.: PCT/EP95/05026

§ 371 Date: Nov. 5, 1996

§ 102(e) Date: Nov. 5, 1996

[87] PCT Pub. No.: WO96/19712

PCT Pub. Date: Jun. 27, 1996

[30] Foreign Application Priority Data

Dec. 20, 1994 [DE] Germany ............... 44 45 378.7

[51] Int. Cl.[6] ............... G01B 7/30; G01D 5/14; G01P 13/00; F02D 41/24
[52] U.S. Cl. ............... 324/207.2; 524/207.25
[58] Field of Search ............... 324/207.2, 207.22, 324/207.25, 166, 173, 174, 175, 207.21; 338/32 H; 340/670, 671, 686; 364/565; 123/414

[56] References Cited

U.S. PATENT DOCUMENTS

| | | | |
|---|---|---|---|
| 4,982,155 | 1/1991 | Ramsden | 324/207.2 |
| 5,008,841 | 4/1991 | McElroy | 324/207.2 |

*Primary Examiner*—Sandra L. O'Shea
*Assistant Examiner*—Jay M. Patidar
*Attorney, Agent, or Firm*—Milde, Hoffberg & Macklin, LLP

[57] ABSTRACT

To determine the angular position of a rotating shaft starting from a standstill and going up to the highest permissible nominal speed and to suppress noise pluses in the square pulse sequence curve precisely corresponding to the tooth flank positions, a magnetic flux density signal received by a Hall cell (1) is compared with a threshold value signal (DC-TH)) in a standstill output unit (2) and a standstill output signal (AS") is produced. In addition, the magnetic flux density curve recorded by the first Hall cell (1) is compared with the magnetic flux density curve recorded by another Hall cell (1) and from that a window signal unit (5) generates a window signal (5) consisting of a sequence of pulses having a period that is approximately equal to a square pulse length. A static output signal (AS') is produced from the falling flank of the first pulse and the falling flanks of the subsequent pulses. The standstill output signal (AS"), the static output signal (AS'), the window signal (FS) and a square pulse sequence (ASR) generated in a dynamic selection circuit (3) connected to the Hall sensor unit (1) are input into an output circuit (6).

13 Claims, 12 Drawing Sheets

PROCESS AND DEVICE FOR DETERMINING THE ANGULAR POSITION OF A ROTATING SHAFT USING A PULSE WHEEL AND A HALL SENSOR

CROSS-REFERENCE TO RELATED APPLICATION

The subject matter of this application is closely related to that of U.S. patent application Ser. No. 08/513,778, filed Sep. 29, 1995, and now U.S. Pat. No. 5,721,486.

BACKGROUND OF THE INVENTION

The invention pertains to a process and a device for determining the angular position of a rotating shaft. With this invention, a Hall sensor in a suitable Hall cell is positioned in front of a pulse wheel that is connected with the shaft; the pulse wheel is provided with at least one tooth, which has one rising tooth flank and one falling tooth flank, and at least one tooth gap. The Hall cell determines the time history of a magnetic flux density, which is generated by the pulse wheel, and delivers a Hall voltage signal. In an output circuit, the Hall voltage signal is converted into a differentiated signal; from that, a square pulse sequence is generated.

A process and a device for determining the position of rotating shafts has been suggested in the published patent application No. DE 43 43 198. A pulse wheel which is provided with teeth is moved with an angular velocity w in front of a Hall sensor with associated magnet. The time history of a magnetic flux density B caused by the pulse wheel is recorded by the Hall sensor as a Hall voltage curve. The recorded signal is differentiated in a dynamic selection circuit, and in a turning point detection circuit, there is generated from the differentiated signal a dynamic output signal which more or less represents the teeth of the pulse wheel. The disadvantage is the fact that by means of the above-mentioned output circuit, a measurement signal is not output until the pulse wheel has attained a certain number of revolutions per unit of time. The angular position cannot be determined below this minimum-revolution number, nor even at the revolution number zero which corresponds to a standstill of the wheel. In addition, the danger exists that noise can superimpose interference on the output signal, which can lead to a corruption of the results of the measurement.

In addition, it is known from published application No. DE 42 09 212 A1 that a differential Hall sensor circuit with two Hall sensors can be placed in the region of a rotating toothed pulse wheel with a permanent magnet. As a result of a specific pitch, the rotating toothed wheel generates a phase-displaced signal in the two Hall sensors. Thus, at least two teeth have to be sensed in order to determine the position of the toothed wheel. This also requires a relatively high velocity of the pulse wheel.

SUMMARY OF THE INVENTION

In accordance with the above, the objective then exists of providing a process and a device for determining the angular position of a rotating shaft which will allow the position of the shaft to be determined beginning from a standstill and going to the highest permissible nominal speed, in conjunction with which, it should be possible for the systematics to suppress noise pulses.

In accordance with the invention, this objective is achieved by means of a process in which a Hall sensor is positioned in front of a pulse wheel which is connected with the shaft, the pulse wheel is provided with at least one tooth, which exhibits one rising tooth flank and one falling tooth flank, and at least one tooth gap, the Hall sensor in the Hall cell records and delivers amounts to 20 revolutions/min.

The advantages achieved with the invention consist particularly in the fact that the position of a shaft can be determined at a standstill, at low revolutions and up to the highest number of revolutions, such as, for example, at 1,500 revolutions/min 3,000 revolutions/min, 10,000 revolutions/min. As a result of the determining of the exact angular position of a shaft, starting from 0, it is, for example, possible to exactly control the injection of gasoline for the individual cylinders right from the start, and subsequently, at higher rotational speeds. Fuel can be saved in this way. Since the dynamic output signal consists of the superimposing of a square pulse sequence on the partial pulse lengths and gaps, noise which may occur and become superimposed on the measurement signal can be suppressed.

The square pulse sequence can be produced by means of processes which are known in the state of the art, and specifically, through the use of one or more, for example, two, Hall sensors.

As a matter of principle, the process can work only with a Hall sensor. Since, however, in accordance with the present state of the art, Hall sensors have available to them only a limited dynamic range, it is suggested that several Hall cells be used, each of which is activated according to the prevailing rotational speed.

As an alternative, there can be produced from at least two Hall sensors two Hall voltage signals the signal difference of which can be used in place of the differential signal.

Preferably, the levels of the window signal can exhibit a pulse half-width which deviates upwards and downwards from the particular transition of the level of the square pulse by about 0.1 percent to 10 percent, preferably 3 percent. As a result, an exact formation of the square pulse can be produced, and also, a noise-free dynamic output signal can be produced as well. By means of the chosen pulse half-width, there can be a deviation between the static and dynamic output signals at the change-over point. The advantages of a pulse signal that is output in a noise-free manner more than makes up for this slight inaccuracy.

It is advantageous if the threshold value signal is produced as a switching window around which the Hall voltage curve of the magnetic flux density of the tooth and the tooth gap is grouped. In conjunction with that, the following advantageous configuration variants are possible:

The threshold value signal with its upper and lower voltage levels is formed by means of a fixed window. During a measurement, the Hall voltage curves of the magnetic flux density are shifted in such a way that the lowest voltage value of the tooth produces the highest voltage level of the switching window, and the lowest voltage value of the tooth gap produces the lowest voltage level.

Another possibility is that of adjusting the switching window by means of a trimming resistor in such a way that, with a fixed Hall voltage curve of the magnetic flux density of the tooth and the tooth gap at the lowest voltage value of the tooth and the lowest voltage level of the switching window, it is introduced at the lowest voltage value of the tooth gap.

According to a further feature of the present invention, a device for detecting the angular position of a rotating shaft, includes a pulse wheel which is connected with the shaft and which exhibits at least one tooth (Z1; Z11, . . . , Z14), which has one rising and one falling tooth flank (ZFA, ZFF), and one tooth gap (Zl1; ZL11, . . . , ZL14);

a hall sensor unit with at least one Hall cell, in front of which the pulse wheel is arranged in a rotating fashion; and a dynamic selecting circuit which is connected with at least one of the Hall cells.

This invention is characterized by the fact that, connected in parallel with the dynamic selection circuit, are a window signal unit and a standstill output unit, to which an output circuit is assigned;

in conjunction with which the first Hall cell is connected with a first input of the window signal unit, whose output is placed on the output circuit;

in conjunction with which the standstill output unit is addressed at its first input with a threshold value signal (DC-TH) and is present with its second input at the first Hall cell and is connected at its output with the output circuit;

and in conjunction with which the output of the dynamic output circuit is placed on the output circuit.

The advantages linked with this consist particularly in the fact that, as a result of the supplementing of a dynamic output circuit with two auxiliary circuits in the form of a window signal unit and a static output unit, the measuring accuracy of the device and the scope of possible applications are expanded substantially. In conjunction with this, the window signal unit drives the output circuit in such a way that a corresponding superimposing and sequencing of the individual output signals takes place, and a uniform position output signal is output.

A second input of the window signal unit can be connected with a second Hall cell. In an advantageous way, the window signal unit also takes over the job of a static output unit at the same time. As a result of this, a very stableal is output. As a result of the fact that the window signal is constantly being generated, the static output signal is generated from this window signal of the window pulse unit at the same time in an advantageous way.

It is advantageous if the window signal unit is comprised of the series connection of a window circuit and a window comparator, in conjunction with which the first Hall sensor is connected to the first input of the window circuit and the second Hall sensor to the second input, and the output of the window comparator is connected with the output logic.

It is advantageous if the window circuit is comprised of a triple comparator and a summing element, in conjunction with which the first Hall sensor cell unit is connected to the first of the triple comparators, the second Hall sensor cell unit is connected to the second, and a power supply unit is connected to the third, and in conjunction with which the outputs of the triple comparator are connected with the three inputs of the summing element, the output of which is assigned to the window comparator and the output circuit. In this way, the proper form of the window signal and the partial pulse length and partial pulse gap is produced.

The standstill output unit can be configured as a comparator. A comparator is a device which is used for comparing two input variables. In this way, it is assured that a uniformly and accurately shaped output signal will be output which exactly represents a tooth or a tooth gap of a pulse wheel that is standing still. Of course, it is also possible to use other devices which work in a comparable manner.

BRIEF DESCRIPTION OF THE DRAWINGS

In the following, the invention is explained in more detail with the aid of the drawing. Specifically, the figures of the drawing show the following:

DESCRIPTION OF THE PREFERRED EMBODIMENTS

FIG. 8d signal curves analogous to FIG. 8a.

Figure 1:
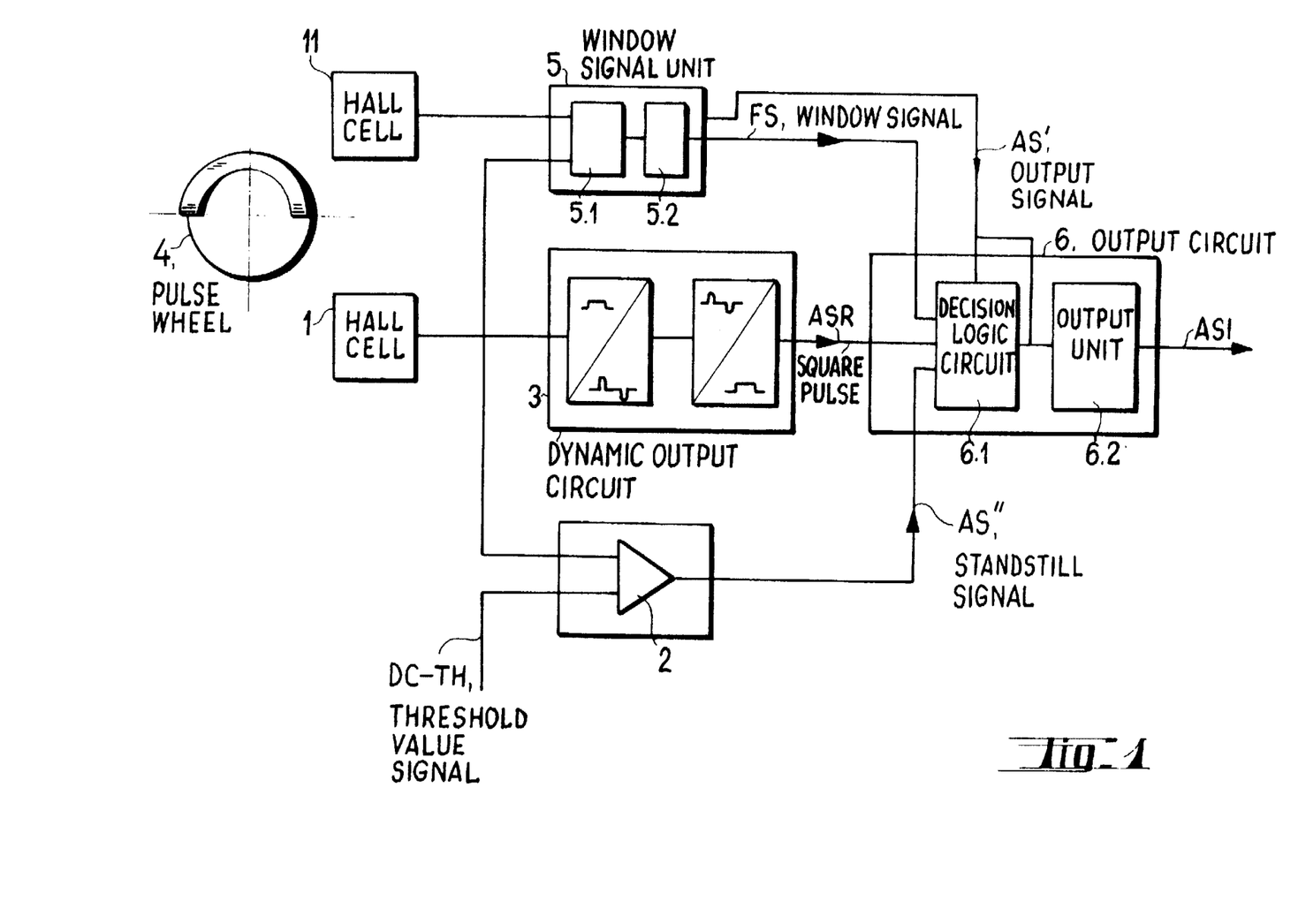
FIG. 1 A block circuit diagram of a device for determining the angular position of a rotating shaft.
Figure 2:
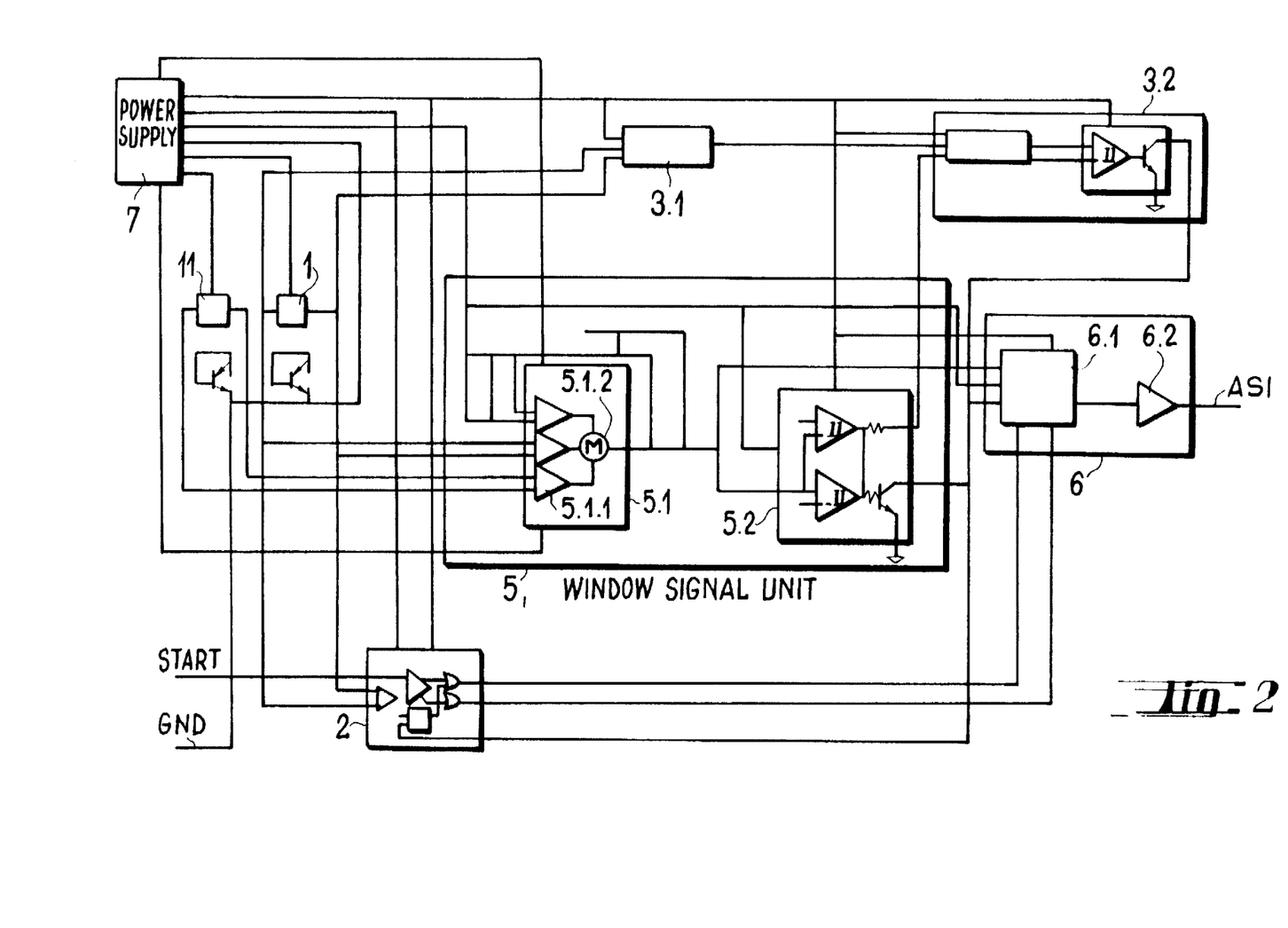
FIG. 2 A basic wiring diagram of a part of the device in accordance with FIG. 1.

A device for determining the angular position of a rotating shaft in accordance with FIGS. 1 and 2 includes a Hall sensor with a first Hall cell 1 and a second Hall cell 11. A pulse wheel 4 is positioned in front of the Hall cells 1 and 11. In conjunction with this, the Hall cells 1 and 11 include all necessary elements that are needed for recording a magnetic flux, among others, a Hall element, a magnet, and a corresponding amplifier circuit for the Hall element. The magnet is a permanent magnet, specifically, an SmCo alloy magnet which assures a minimum magnetic flux of 150 mT in the Hall element. The magnetic properties are specified over a temperature range of from −15° C. to +220° C. As a result of a high coercive field strength, the magnet cannot be demagnetized, even by the magnetic noise fields that occur in a vehicle. The magnet can also be made of other magnetic materials, such as barium titanate ferrites. The possibility of using specially designed electromagnets should also not be excluded. Connected to the Hall cell 1 is a dynamic output circuit 3. It is comprised of the differential element 3.1 and the turning point detection circuit 3.2 connected in series.

Figure 3:
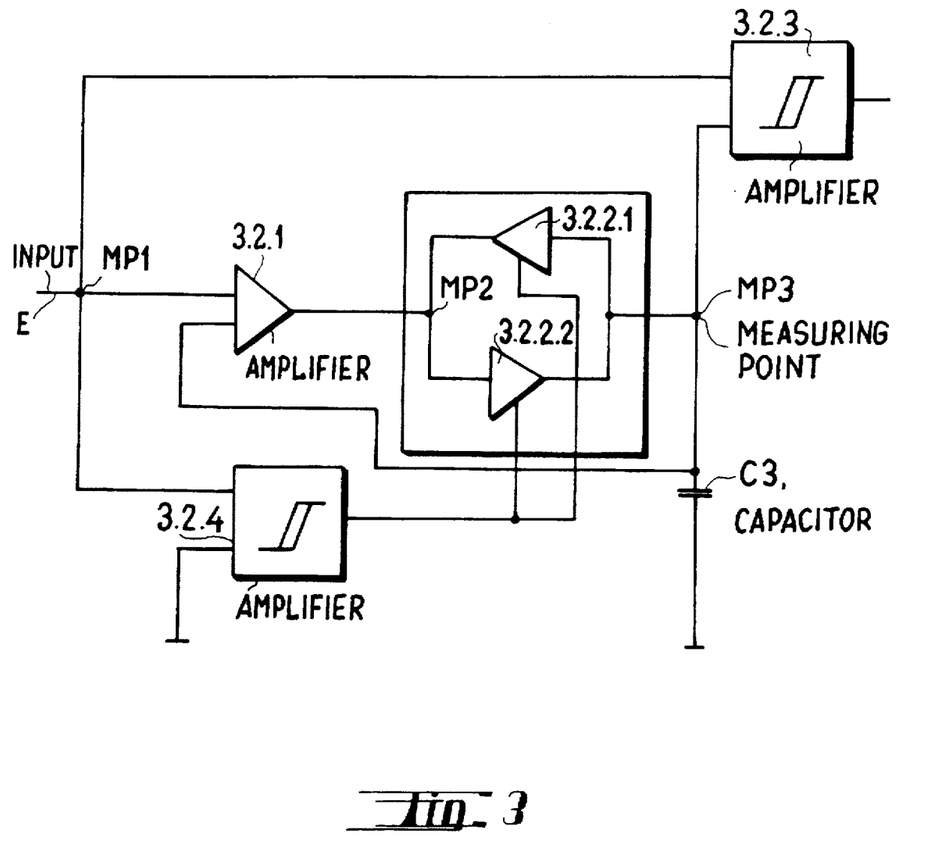
FIG. 3 A block circuit diagram of a turning point detection circuit of a device in accordance with FIG. 1.

As is shown in FIG. 3, the input E of the turning point detection circuit 3.2 leads to the first input of an amplifier 3.2.1, to the first input of an amplifier 3.2.3, and to the first input of an amplifier 3.2.4. The second output of the comparator 3.2.4 goes to ground. The output of the amplifier 3.2.1, the second input of the comparator 3.2.3, which goes to ground GND via a capacitor C3, and the output of the comparator 3.2.4 are connected with a bi-directional driver 3.2.2. The bi-directional driver 3.2.2 is comprised of two correspondingly connected driver stages 3.2.2.1 and 3.2.2.2. Inside the turning point detection circuit 3.2 there is at input E a measuring point MP1 at the connection point of the input of the amplifier 3.2.1, the input of the comparator 3.2.3, and the input of the comparator 3.2.4, a measuring point MP2 at the connection point of the output of the amplifier 3.2.1, the output of the driver stage 3.2.2.1 and the input of the driver stage 3.2.2.2, in conjunction with which both driver stages are connected to the output of the comparator 3.2.4, and a measuring point MP3 at the connection point of the connection from the input of comparator 3.2.3 to the input of the amplifier 3.2.1 or capacitor C3.

As FIGS. 1 and 2 also show, a standstill output unit 2 and a window signal unit 5 are in parallel with the dynamic output circuit 3. Placed in series with the dynamic output circuit 3 is an output circuit 6. Available at the latter is a decision logic circuit 6.1, behind which is placed an output unit 6.2.

The standstill output unit 2 is configured as comparator 2; the latter has its first input at a threshold value signal DC-TH, and with its second input at the Hall sensor 1. The output of the comparator 2 is connected with the decision logic circuit 6.1.

The pulse wheel 4 which rotates in front of the Hall cells 1 and 11 can have various configurations.

Figure 4A:
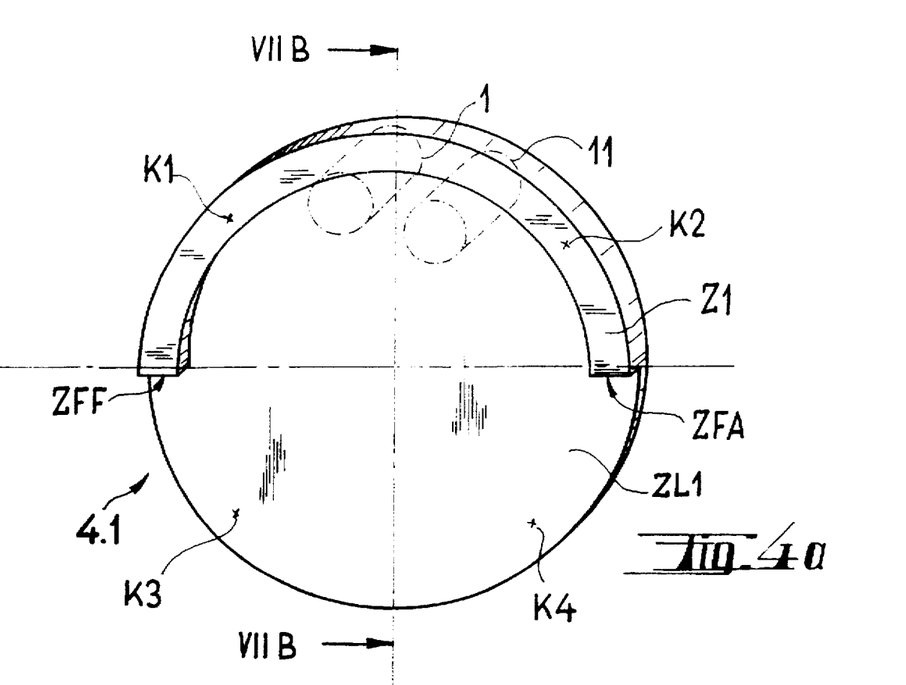
FIG. 4a A pulse wheel of a device in accordance with FIG. 1, in a schematic side view.
Figure 4B:
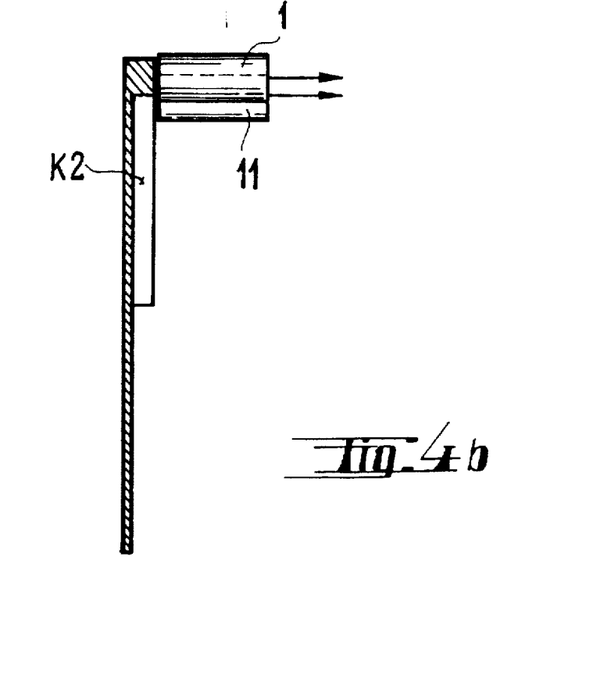
FIG. 4b A section of a pulse wheel in accordance with FIG. 7a along the line VIIB—VIIB, and FIG. 5 An additional pulse wheel of a device in accordance with FIG. 1, in a schematic side view.

A pulse wheel 4.1 in accordance with FIGS. 4a and 4b possesses a single tooth Z1 and a single tooth gap ZL1. Both the tooth Z1 and the tooth gap ZL1 have a width of approximately 180°. The tooth Z1 exhibits one rising tooth flank ZFA and one falling tooth flank ZFF.

Figure 5:
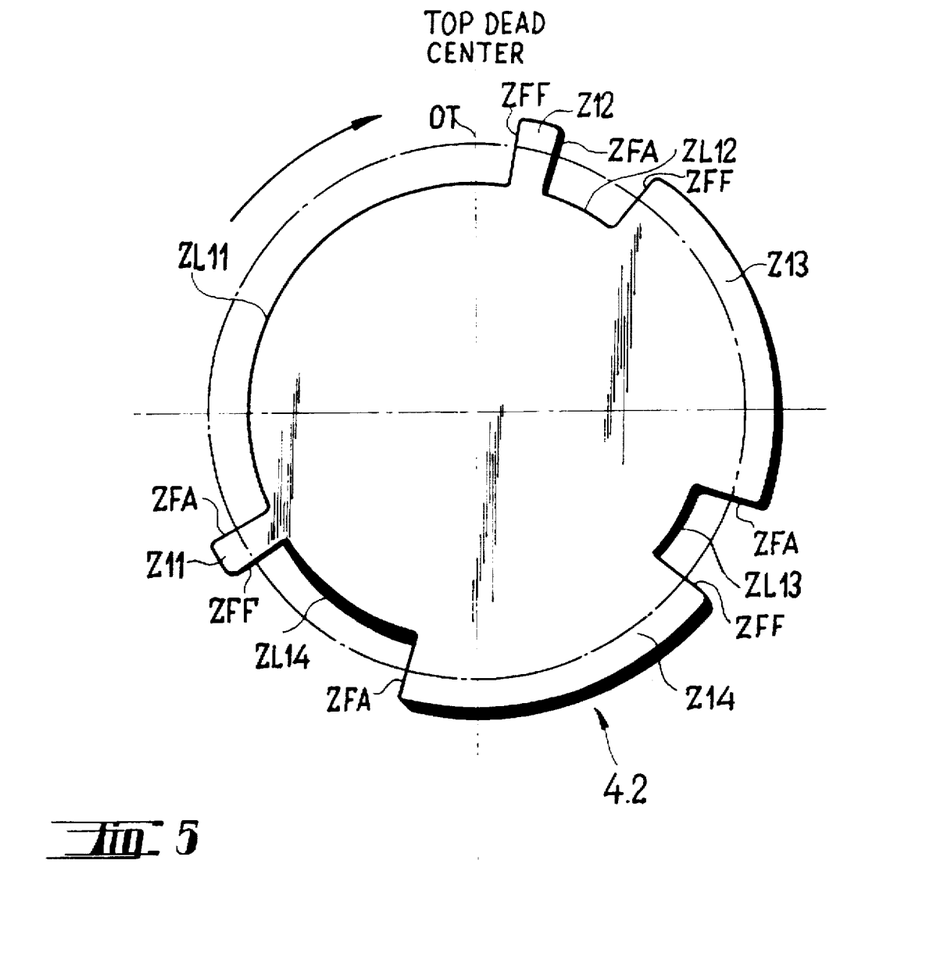

In FIG. 5, a specially equipped pulse wheel 4.2 is shown, which is connected with the shaft, specifically, with the camshaft. OT indicates top dead center.

The pulse wheel 4.2 exhibits teeth Z11, Z12, Z13 and Z14. The teeth Z11 and Z12 are configured the same, and have a width of approximately 8° with an angle at circumference of 360°. By contrast, the teeth Z13 and Z14, which are also configured the same, each have a width of 65°.

The tooth flanks of the teeth Z11 through Z14 are at the following distances from one another:
a) The rising tooth flank ZFA of the tooth Z11 has a distance of 8° from the falling tooth flank ZFF;
b) The falling tooth flank ZFF of the toothed wheel Z11 has a distance of 60° from the rising tooth flank ZFA of the toothed wheel Z14;
c) The rising tooth flank ZFA of the toothed wheel Z14 has a distance of 65° from the falling tooth flank ZFF of the toothed wheel Z14;
d) The falling tooth flank ZFF of the toothed wheel Z14 has a distance of 20° from the rising tooth flank ZFA of the toothed wheel Z13;
e) The rising tooth flank ZFA of the toothed wheel Z13 has a distance of 65° from the falling tooth flank ZFF of the toothed wheel Z13;
f) The falling tooth flank ZFF of the toothed wheel Z13 has a distance of 20° from the rising tooth flank ZFA of the toothed wheel Z12;
g) The rising tooth flank ZFA of the toothed wheel Z12 has a distance of 8° from the falling tooth flank of the toothed wheel Z12;
h) The falling tooth flank of the toothed wheel Z12 has a distance of 114° from the rising tooth flank of the toothed wheel Z11.

In comparator 2, the measured values of the Hall sensor 1 are compared with the threshold value signal DC-TH. The threshold value signal DC-TH, represented by a direct-current value, is limited by an upper voltage level UHFH and a lower voltage level UHFL. As is shown in FIG. 5, the voltage levels UHFH and UHFL form a switching window SF, which is limited by the voltage levels.

The function of the parts and additional elements shown in the FIGS. 1 through 4 will be explained in the following.

Figure 6A:
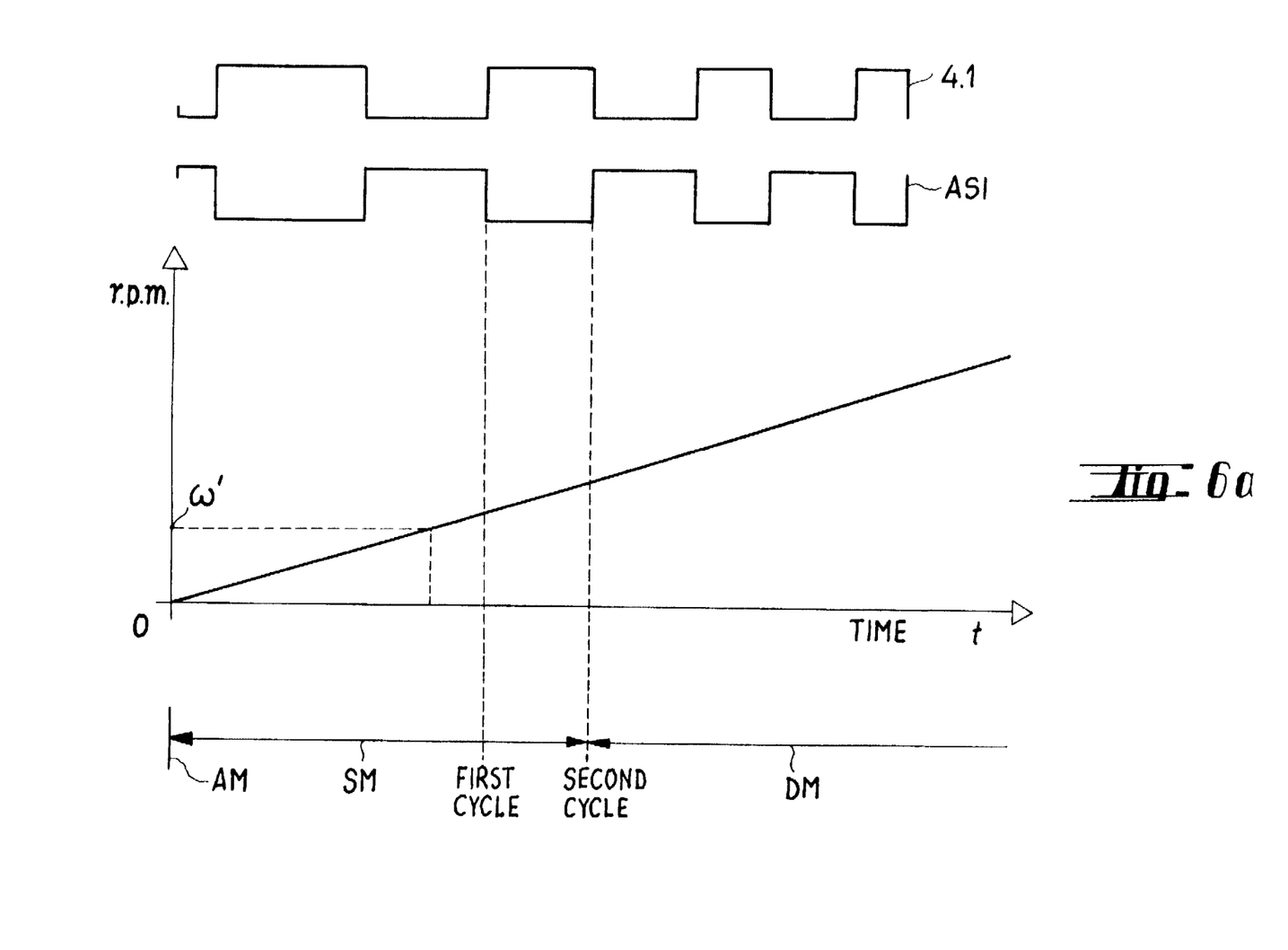
FIG. 6a and b Representations of the changeover behavior of a device in accordance with FIG. 1.

A pulse wheel 4.1 rotates in front of the Hall cells 1 and 11 as shown in FIGS. 4a and 4b. A development of the pulse wheel 4.1 at an increasing number of revolutions per unit time is shown in FIG. 6a as curve 4:1 (IR). The faster the pulse wheel turns, the shorter the duration of the passing of the teeth and teeth gaps past the Hall cells. In conjunction with this, the teeth exhibit one rising and one falling tooth flank ZFA and ZFF as has already been described.

The comparator 2 represents the standstill element. In it, the measured values of the Hall cell 1 are compared with the threshold value signal DC-TH. The threshold value signal DC-TH, which is a direct-current signal, is limited by an upper and a lower voltage level UHZ and UZL. It forms, as FIG. 7 shows, a switching window SF which is limited by a highest tooth gap Hall voltage value UHZLmax and a lowest tooth gap Hall voltage value UHZLmin.

Figure 7:
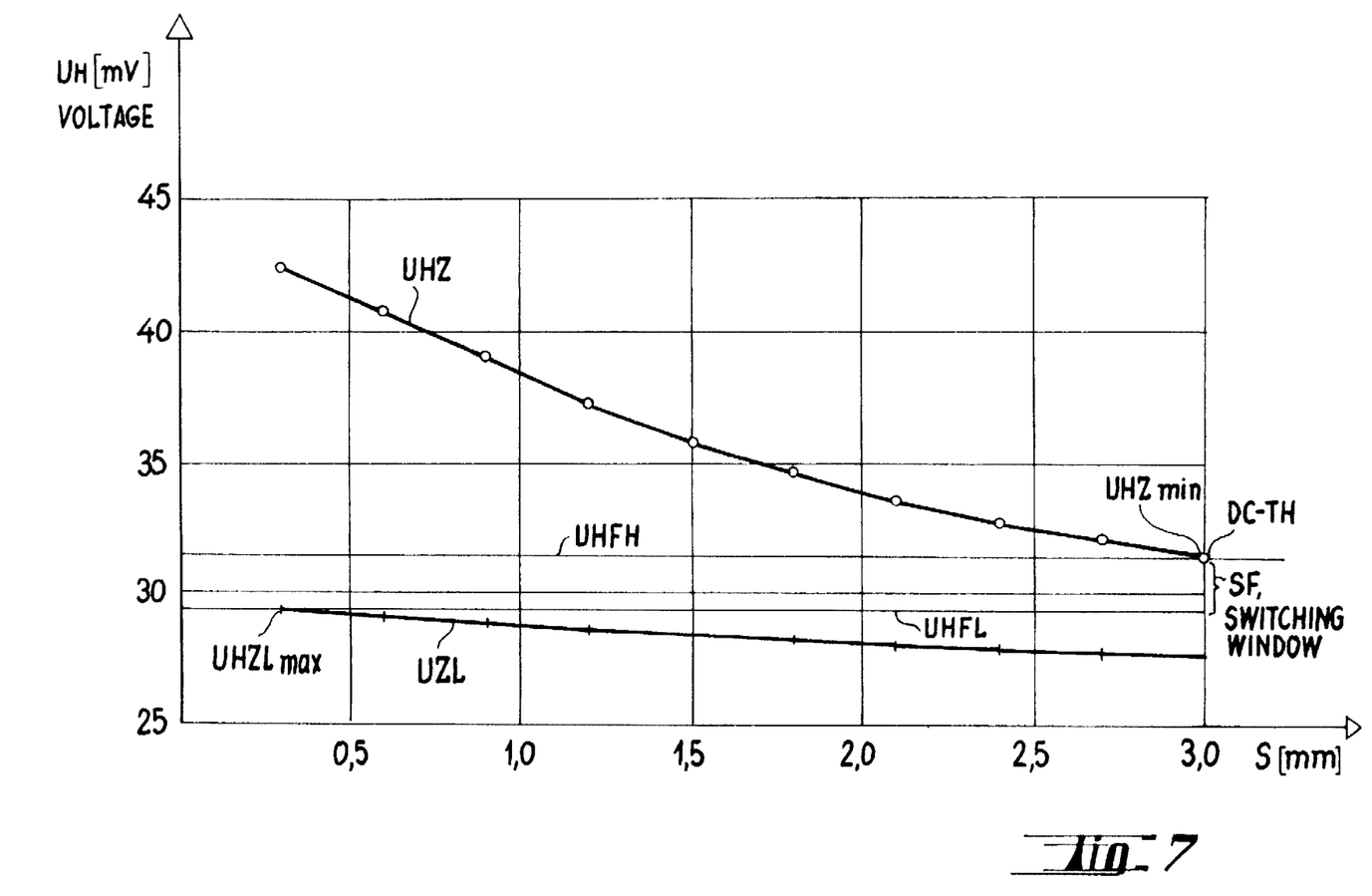
FIG. 7 A representation of a switching window of a threshold signal relative to the Hall voltage curve which occurs with a pulse wheel.

Shown in FIG. 7 in addition to that is the curve of the tooth Hall voltage UHZ and the tooth gap Hall voltage UHZL. The lowest tooth Hall voltage level UHZmin limits the highest switching window level UHFH and highest tooth gap Hall voltage value UHZmax limits the lowest switching window level UHFL.

The adjustment of the switching window SF between the two Hall voltage curves is possible in two ways:
a) With the aid of a trimming resistor, the switching window SF is shifted in such a way that it comes to lie between the lowest tooth Hall voltage value UHZmin and the highest tooth gap Hall voltage value UHZmax. In conjunction with this, the two Hall voltage curves remain unchanged.
b) The switching window SF of the threshold value signal DC-TH is fixed. The Hall voltage curves are shifted in such a way that the lowest tooth Hall voltage value UHZmin lies above the upper switching window voltage level UUHFH, and the highest tooth gap Hall voltage value UUHZL lies below the lower switching window voltage level UHFL.

Figure 8A:
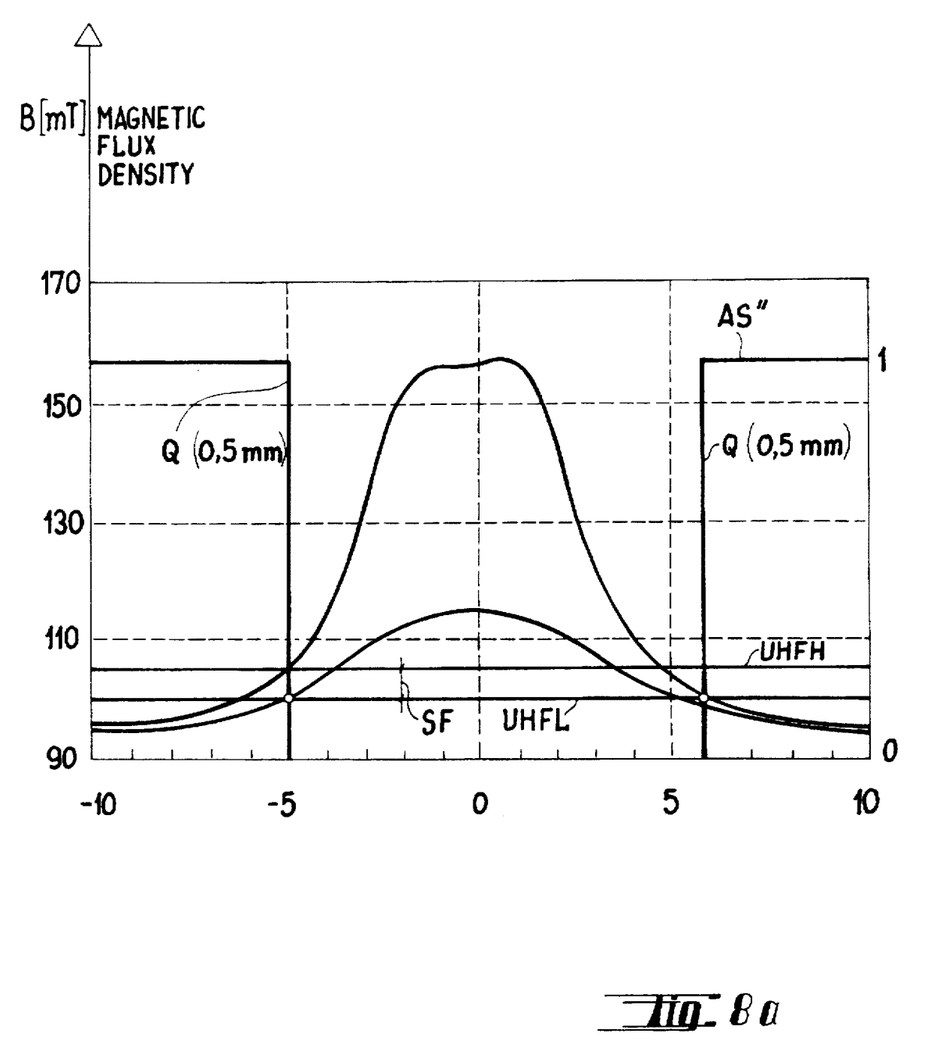
FIG. 8a An overview of signal curve shapes that occur in a standstill output unit of a device in accordance with FIGS. 1 and 2, in a schematic representation.

In conjunction with this, the signal AS which is present at the output of the comparator 2 has the shape that is shown in FIG. 8a. It is clear that the delivered signal AS has a shape which approximately corresponds to that of a tooth.

The dynamic output circuit 3 makes use of the fact that, as has already been indicated in DE 43 43 198, the magnetic flux density B changes fastest twice, at the tooth flanks. Thus, the temporal derivation from B $$B(t)=dB/dt$$

has a pronounced maximum at the rising tooth flank ZFA and a pronounced minimum at the falling tooth flank ZFF.

Figure 8B:
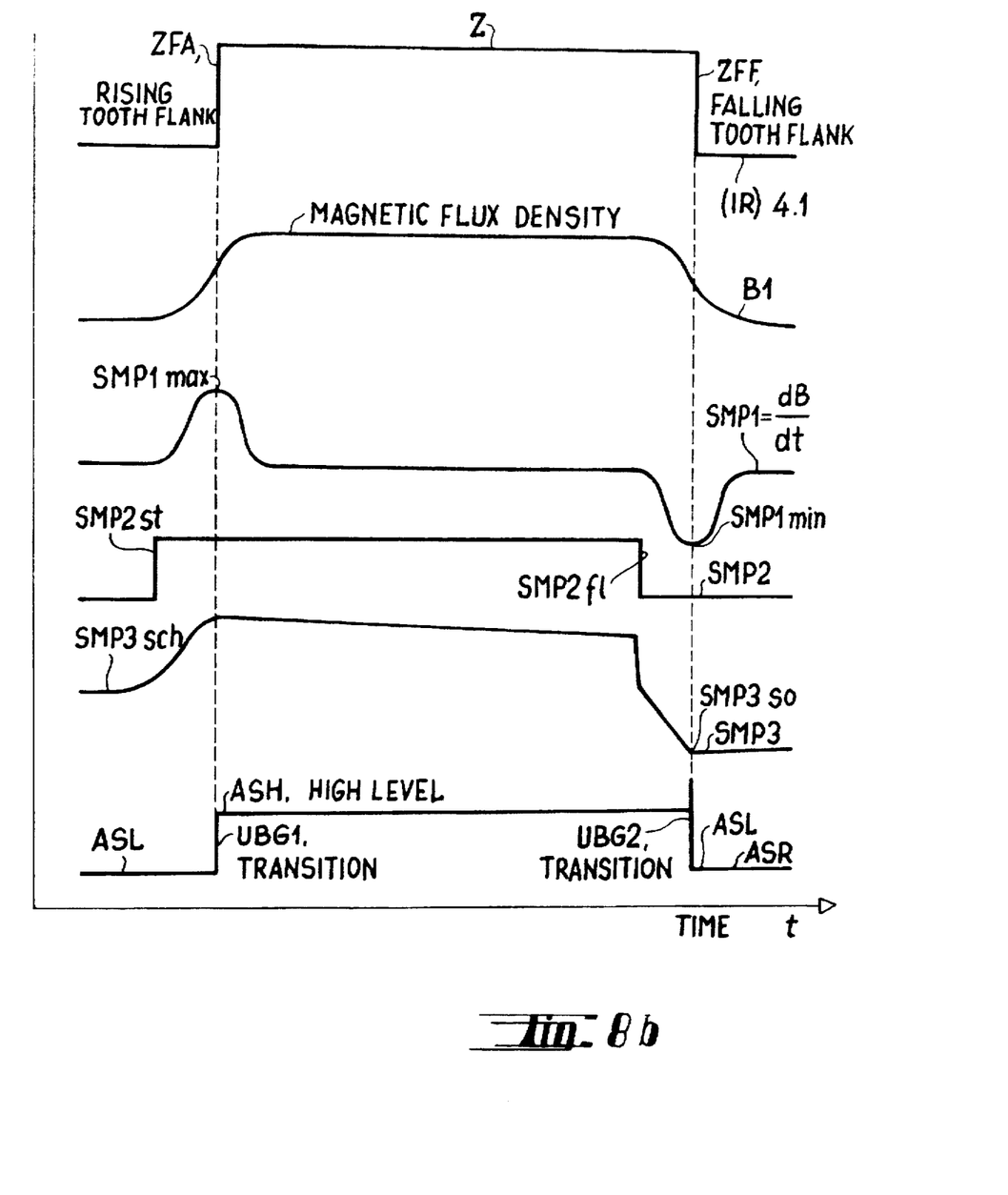
FIG. 8b An overview of signal curve shapes that occur in a dynamic selection unit of a device in accordance with FIGS. 1-3, in a schematic representation.

The pulse wheel 4.1 that is rotating in front of the Hall cell 1 exhibits the tooth Z, which possesses one rising and one falling tooth flank ZFA and ZFF. In conjunction with that, as FIG. 8b shows, the curve of the flux density B(t) is sensed by the Hall cell 1. B(t) is characterized by one rising (left) and one falling (right) flank. The signals corresponding to the flux density B(t) are amplified in a corresponding amplifier circuit, and are input into the differential element 3.1. In conjunction with that, the signal B(t) is converted into a differentiated measurement signal $$dB/dt=SMP1$$

The measurement signal SMP1 is characterized by deflections the highest point of the maximum deflection is SMP1max, and SMP1min is the minimum point.

The differentiated measurement signal SMP1 that has been converted in this way is present at the input E of the turning point detection circuit 3.2 at measuring point MP1 (cf. FIG. 3). By means of its deflection SMP1max, the differentiated measurement signal SMP1 controls the driver stages 3.2.2.1 and 3.2.2.2 of the bi-directional driver 3.2.2 in such a way that a square-shaped measuring point signal SMP2 is present at measuring point MP2. In conjunction with that, the rising flank SMP2st of the square-shaped measuring point signal SMP2 coincides with the beginning rise of the differentiated measurement signal SMP1. At the same time, the capacitor C3 is charged to its maximum value at measuring point MP3.

With the start of the minimal deflection of the differentiated measurement signal SMP1, a falling flank SMP2fl of a square-shaped measurement signal SMP2 is generated. This leads to a discharge of the capacitor C3. The corner measurement signal SMP3 that was generated in this way by the capacitor C3 is characterized by a peak value SMP3sch and by a base value of SMP3so.

At the output of the comparator 3.2.3, a square pulse ASR with a High level ASH is output when the peak value is attained, and a Low level ASL is output when the base value SMP3so is attained.

As is made clear in FIG. 8b, the square pulse ASR reflects the shape of the tooth Z. In conjunction with that, a transition UBG1 from the Low level ASL to the High level ASH corresponds to the tooth flank ZFA, and a transition UBG2 from the High level ASH to the Low level ASL corresponds to the falling tooth flank of the tooth Z. Through the sequence of High and Low levels, it is possible to generate a corresponding pulse sequence ASR.

Figure 8C:
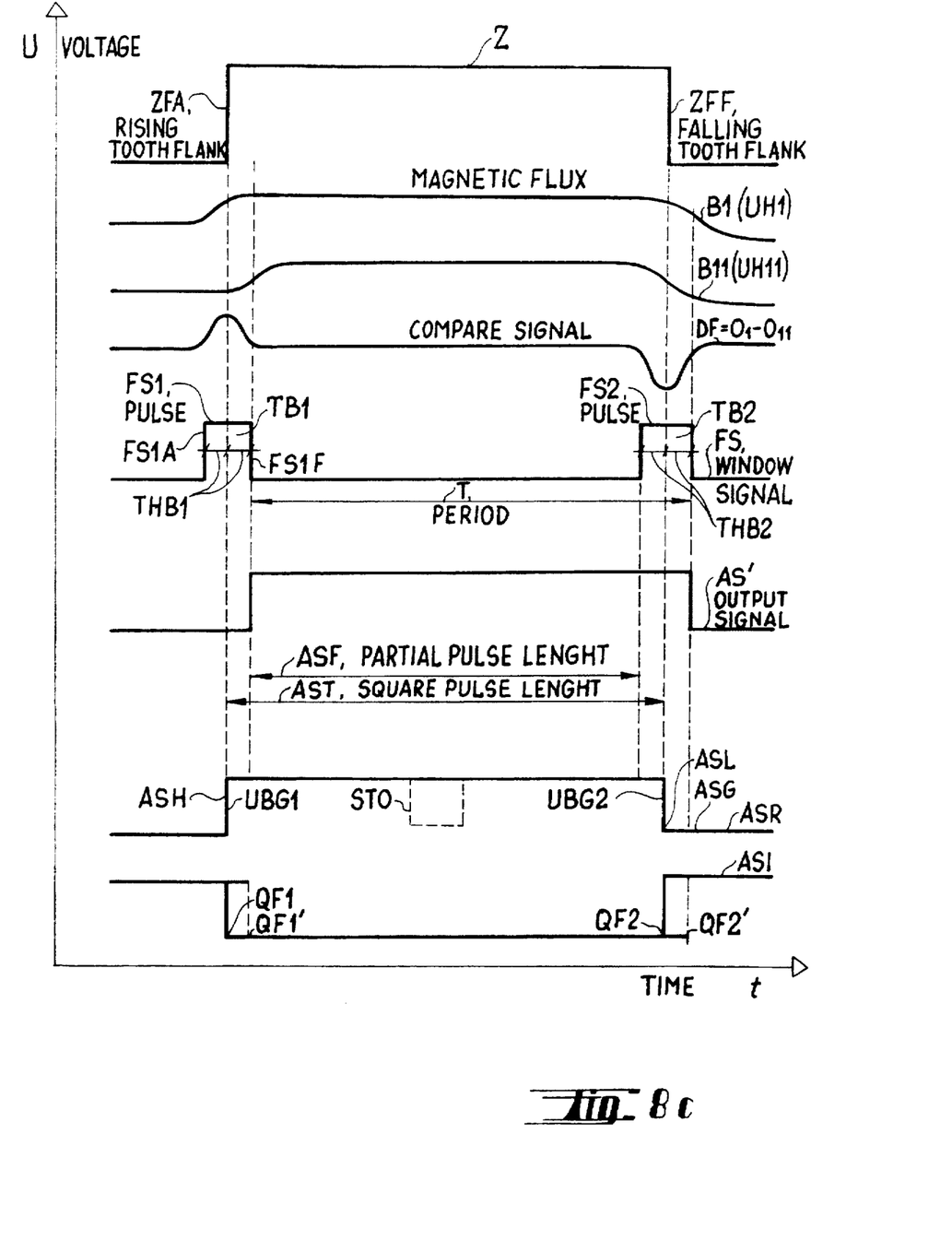
FIG. 8c An overview of signal curve shapes that occur in a window signal unit and an output circuit in a device in accordance with FIGS. 1 and 2, in a schematic representation.

The functioning of the window signal unit 5 in accordance with FIGS. 1 and 2 takes place as follows:

When the toothed wheel 4, 4.1 or 4.2 turns in front of the Hall cells 1 and 11, the magnetic flux B1(t) and B11(t) is determined from the mapping of a tooth Z with one rising and one falling tooth flank ZFA and ZFF, as is shown in FIG. 8c in particular. The signals corresponding to the flux density curves B1(t) and B11(t) are amplified and compared with one another, i.e., the difference is produced, and a compare signal DF is generated. From that, a window signal FS with pulses FS1 and FS2 is produced.

In conjunction with that, the pulses FS1 and FS2 overlie the transitions UBG1 and UBG2 of the square pulse signal ASR of the dynamic evaluation circuit 3 in such a way that their level widths TB1 and TB2 respectively are divided into two equal halves THB1 and THB2. The level width halves THB1 and THB2 correspond to a width of approximately 3°. The window signal FS has a period T, which approximately corresponds to a square pulse length AST (tooth image) of the square pulse ASR. With the aid of the triple comparator 5.1.1 andt 5.1.2, a pulse length is formed which extends from a falling flank FS1F of the pulse FS1 to the falling flank FS2F of the pulse FS2, and a static output signal AS is generated. In conjunction with that, this static output signal also reflects the tooth Z, but with the phase shift THB=3° that was already mentioned.

In the decision logic circuit 6.1, the window signal FS and the square pulse signal ASR are compared with each other. If there is no square pulse signal ASR up to a certain rotational speed of the pulse wheel 4.1, the static output signal AS is forwarded. If the square signal ASR is present starting at a certain rotational speed, it is linked with the window signal FS in the decision logic 6.1, and there is generated by the decision logic 6.1 a partial pulse length ASF, which extends from the falling flank FS1F of the pulse FS1 to the rising flank FS2A of the pulse FS2.

A partial pulse gap length ASG is generated in an analogous way (cf. FIG. 8c). The pulse sequence consisting of square pulses ASR is linked with the partial pulse lengths ASF and the partial pulse gap lengths ASG, and is output, as a dynamic signal which is still sensitive to noise, as the position output signal ASI. During recording or generation, noise pulses STO which may occur cannot corrupt the position output signal.

The manner of operation of the device in accordance with the invention, as it derives from the above, can explained as follows:

Starting from a standstill and continuing up to its nominal rotational speed, the pulse wheel 4.1 in accordance with FIGS. 4a and 4b, which is rotating in front of the Hall cells 1 and 11, generates a development which corresponds to the curve IR in FIG. 4a. This development approximately corresponds to a signal sequence of the position output signal ASI that is delivered to the output signal unit 6.2.

In conjunction with that, the device in accordance with the invention represents the following branches:

A) A Standstill Branch
It is represented by the Hall cell 1 and the comparator 2. In accordance with FIG. 6a, it works in the starting mode AM and outputs a standstill signal AS.

B) A Static Branch
It is represented by both Hall cells 1 and 11, and the window circuit 5; in the static mode SM in accordance with FIG. 4a, it outputs a static output signal AS.

C) A Dynamic Branch
It consists of the interconnection of the Hall cell 1 and the dynamic output circuit 3, and in accordance with FIG. 4a, outputs in the dynamic mode DM an output signal ASR.

D) A Noise Pulse Suppression Branch
It consists of the Hall cells 1 and 11, the window circuit 5 and the output circuit 6. It outputs the position output signal ASI Starting Mode AM The amplified and temperature-compensated Hall signal is sent to the comparator 2 and, as has already been described, is compared with the switching point which has been set externally and which is represented by the threshold value signal DC-TH. At high fluxes (tooth) the output switches through (Low level).

The output signal AS that has been generated in this way is sent to the decision logic circuit 6.1, which, because the window signal is not available and the peak pulse ASR is not present, outputs it via the output unit 6.2 as the starting signal of the position output signal ASI.

SM Mode with Increased, but Still Relatively Low, Rotational Speed

Figure 6B:
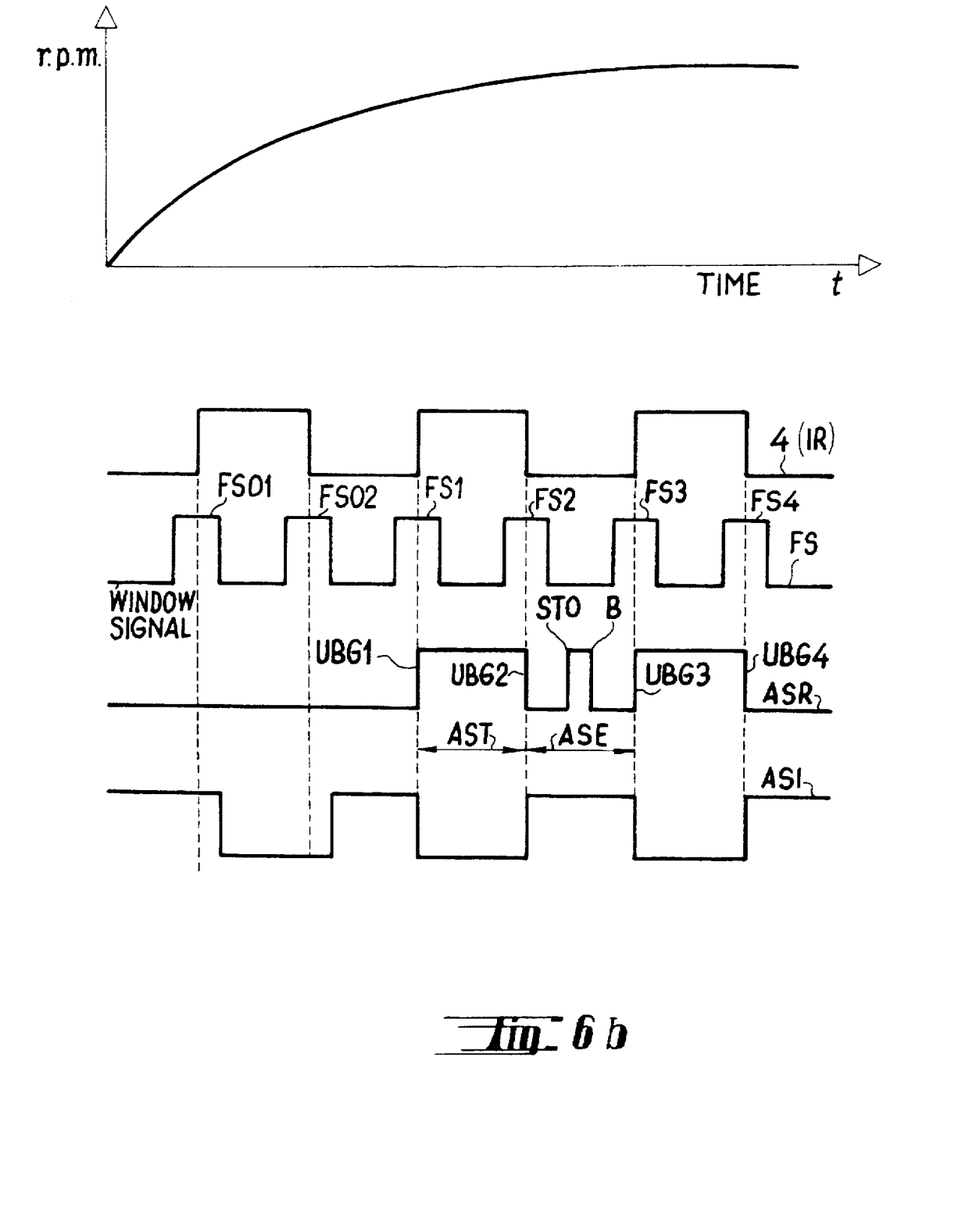

With an increase in the nominal rotational speed n of the toothed wheel 4.1, the window signal FS is generated, in the manner already described, as a sequence of pulses FS01, FS02, FS1, FS2, FS3 and FS4 (cf. FIG. 6b). As this is done, the static output signal AS is generated, which has already been explained with the aid of FIG. 8c. This signal is present at the decision logic circuit 6.1. If the window signal FS is present, a decision is made in addition, that if the square output signal ASR is not present in place of the standstill output signal AS the static output signal AS is now to be output, via the output unit 6.2, as the position output signal ASI.

The window circuit 5 can be connected in such a way that, after an increase of the nominal rotational speed n of the pulse wheel, only the window signal FS is generated in the described pulse sequence FS01..... In this instance, the comparator 2 also outputs via the output unit 6.2, after the standstill signal AS, the static output signal AS as the position output signal ASI.

Dynamic Mode DM (High Speed)

With the aid of the two Hall cells 1 and 11, a switching window is opened at each of the tooth flanks ZFA and ZFF, which is produced by means of the partial pulse lengths ASF and the partial pulse gaps ASG. Square signals from the dynamic output circuit are passed to the output only within this window.

If a square pulse signal ASR is present within the window, the decision logic circuit 6.1 switches the output circuit 6 over. This function has the advantage that undesirable noise signals STO, which are brought about by a height eccentricity in the pulse wheel or by electromagnetic irradiation, are prevented, and in addition, operation >0 revolutions/min is made possible.

With the circuit board of a function module installed, the peak points of the window signal unit 5 (cf. FIG. 8c, signal DF) are aligned in order to avoid series dispersion and to ensure symmetrical switching. As the result of the instalcircuit (IC) or as a result of the inhomogeneities of the magnets, early or late switching of he window signal unit 5 can occur. In order to maintain symmetrical window signal FS, the offset of the assembled device is compensated for by means of a trimming resistor in the window circuit 5.1. Depending on the window signal unit 5, the scanning direction of the pulse wheel is to be taken into account during the assembly.

Thus, above a mode change rotational speed nm of approximately 20 revolutions/min, the pulse sequence made up of the still noise-sensitive square pulses ASR is linked with the partial pulse lengths ASF or the partial pulse gap lengths ASG, and the noise-sensitive dynamic signal is output as position output signal ASI.

Figure 8D:
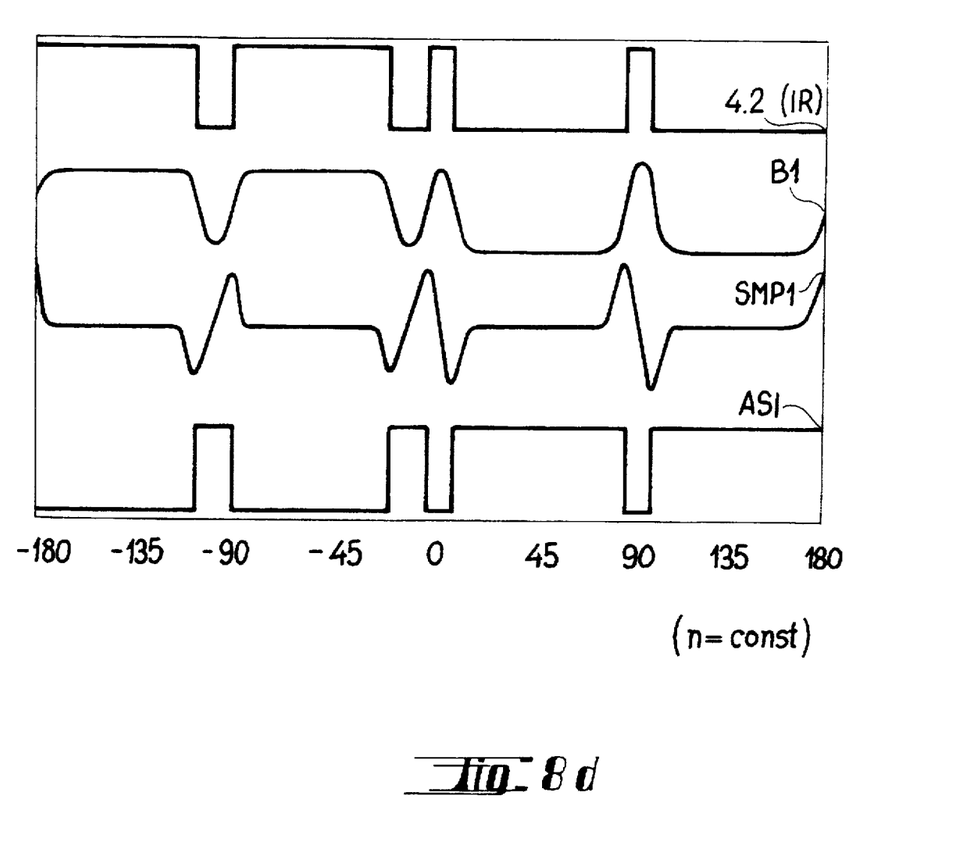

If a pulse wheel 4.2 is used which approximately corresponds to the one in FIG. 5, pulse sequences such as are shown in FIG. 8d occur. As can be seen, the position output signal ASI accurately reflects the pulse wheel 4.2.

The device in accordance with the invention is used in particular for determining piston position of a fuel-powered drive engine. The possible positions of the pistons K1, K2, K3 and K4 are drawn in FIGS. 4a and 4b. Even at a standstill, the device can determine which position the pistons K1, . . . are in. The tooth Z1 and the gap ZL1 pass the positions of the pistons K1 and K2 or K3 and K4 on to an electronic control system, with the help of which the injection of fuel is carried out only, for example, in the pistons K1 and K2. In this regard, the pistons K1 and K2 are the pistons that exert the greatest for the starting torque. By doing this, fuel is saved in a very purposeful way.

When the engine runs further, the positions of each of the individual pistons K1. . . . are recorded, and at higher speeds, in the most problem-free and accurate way possible, and gasoline is injected only into the particular appropriate piston K1, . . . , so that a maximum exertion of force is guaranteed. At rotational speeds above the mode change speed n, the position of the tooth flanks can be determined with an accuracy of ±0.5° at working distances of 0.3 mm to 2.1 mm and in a temperature range between −40° and 150°. Depending on the tooth distribution, however, the resolution improves with an increasing number of teeth Z. The device can be used on pulse wheels (IR) whose tooth module is greater than 2.

There has thus been shown and described a novel process and device for determining the angular position of a rotating shaft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Process for determining the angular position of a rotating shaft, in which a Hall sensor with a Hall cell (1; 11) is positioned in front of a pulse wheel (4; 4.1; 4.2) which is connected with the shaft, the pulse wheel exhibits at least one tooth (Z1; Z11, . . . , Z14) which exhibits one rising and one falling tooth flank (ZFA, ZFF), and which is provided with at least one tooth gap (ZL1; ZL11, . , . , ZL14), the Hall cell (1, 11) picks up, as a function of time, the curve of a magnetic flux density (B) which is generated by the pulse wheel (4; 4.1; 4.2), and conveys it as a Hall voltage signal (UH), the Hall voltage signal (UH) is converted in an output circuit (3) into a differentiated signal (SMP), and a square pulse sequence (ASR) is generated from that, with the following additional process steps:

comparison of the Hall voltage signal with a threshold value signal (DC-TH) and production of a standstill output signal (AS)

differentiation of the signal (UH) after the time t to a differentiating voltage (DF)

$$DF=dUH/dt$$

production of a window signal FS by means of the comparison signal DF in accordance with the following rule:

FS=1 if DF not equal to zero
FS=0 if DF equals zero production of a position output signal (ASI) from the standstill signal (AS) at a number of revolutions n=0 revolutions/min, production of the position output signal (ASI) from the window signal FS and from the standstill signal (AS) at a rotational speed below a mode change rotational speed (n), and at a rotational speed (n) above the mode change rotational speed (n), from the square pulse sequence (ASR), whereby the mode change rotational speed (n) is greater than 1 revolution/min, and preferable amounts to 20 revolutions/min.

2. Process in accordance with claim 1, characterized by the fact that the Hall sensor is equipped with several Hall cells, each of which is activated according to the prevailing rotational speed (n).

3. Process in accordance with claim 1, characterized by the fact that from at least two Hall cells (1, 11), two Hall voltage signals (UH1, UH11) are generated, the signal difference of which is used in place of the differential signal (DF).

4. Process in accordance with claim 1, characterized by the fact that window signal levels (FS1, FS2) exhibit a pulse half-width (THTB1, THTB2) which deviate approximately ±0.1 percent, preferably 3 percent, from the particular transition (UBG1, UBG2) of the level (AFL, ASH) of the square pulse (ASR).

5. Process in accordance with claim 1 characterized by the fact that the threshold value signal (DC-TH) is produced by means of a fixed switching window (SF), around which the Hall voltage curve of the magnetic flux density (B1) of the tooth (Z1; Z11, . . . , Z14) and the tooth gap (ZL1; ZL11, . . . , ZL14) are adjusted in such a way, whereby the lowest Hall voltage value (UHZmin) of the tooth (Z1; Z11, . . . , Z14) produces the highest voltage level (UHFH) of the switching window (SF), and the highest all voltage value (UHZmax) of the tooth gap (ZL1; ZL11, . . . . ZL14) produces the lowest voltage level (UHFL).

6. Process in accordance with claim 1, characterized by the fact that the switching window (SF) of a threshold value signal (DC-TH) is adjusted by means of a trimming resistor in such a way that with a fixed Hall voltage curve (U) of the magnetic flux density (B1) of the tooth (Z1; Z11, . . . . Z14), the highest voltage level (UHFH) is forwarded to the lowest voltage value (UHZmin) of the tooth (Z1; Z11, . . . . Z14), and the lowest voltage value (UHFL) of the switching window (SF) to the lowest voltage value (UHZmax) of the tooth gap (Z11; ZL11, . . . . ZL14).

7. Device for detecting the angular position of a rotating shaft, including a pulse wheel (4, 4.1, 4.2) which is connected with the shaft and which exhibits at least one tooth (Z1; Z11, . . . , Z14), which has one rising and one falling tooth flank (ZFA, ZFF), and one tooth gap (Z11; ZL11, . . . , ZL14), a hall sensor unit with at least one Hall cell (1, 11), in front of which the pulse wheel (4, 4.1, 4.2) is arranged in a rotating fashion, and a dynamic selection circuit (3) which is connected with at least one of the Hall cells (1) characterized by the fact that connected in parallel with the dynamic selection circuit (3) are a window signal unit (5) and a standstill output unit (2), to which an output circuit (6) is assigned, in conjunction with which the first Hall cell (1) is connected with a first input of the window signal unit (5), whose output is placed on the output circuit (6), in conjunction with which the standstill output unit (2) is addressed at its first input with a threshold value signal (DC-TH) and is present with its second input at the first Hall cell (1) and is connected at its output with the output circuit (6), and in conjunction with which the output of the dynamic output circuit (3) is placed on the output circuit (6).

8. Device in accordance with claim 7, characterized by the fact that a second Hall cell (11) is placed at a second input of the window signal unit (5).

9. Device in accordance with claim 7, characterized by the fact that the window signal unit (5) is at the same time a static output unit.

10. Device in accordance with claim 7, characterized by the fact that the window signal unit (5) consists of the series connection of a window circuit (5.1) and a window comparator (5.2), in conjunction with which the first Hall sensor unit (1) is connected to the first input of the window circuit (5.1) and the second Hall sensor unit (11) to the second, and the output of the window comparator (5.2) is connected with the output circuit (6).

11. Device in accordance with claim 7, characterized by the fact that the window circuit (5.1) consists of a triple comparator (5.1.1) and a summing element (1.2), in conjunction with which the first Hall sensor unit (1) is connected to the first of the triple comparators, the second Hall sensor unit (11) to the second, and a power supply (7) to the third, and in conjunction with which the outputs of the triple comparator (5.1.1) are connected with the three inputs of the summing element (5.1.2), the output of which is placed on the window comparator (5.2) and on the output circuit (6).

12. Device in accordance with claim 7, characterized by the fact that the output circuit (6) consists of a decision logic circuit (6.1) and a following output unit (6.2), in conjunction with which the first input of the decision logic circuit (6.1) is connected with the output of the window circuit (5.2), the second input with the output of the dynamic selection circuit (3), and the third input with the output of the standstill output unit (2), and in conjunction with output of the output unit (6.2).

13. Device in accordance with claim 7, characterized by the fact that the standstill output unit is a comparator (2).

* * * * *